C. P. SLY.
CHAIN SAW.
APPLICATION FILED JAN. 3, 1919.

1,363,171. Patented Dec. 21, 1920.

INVENTOR
Cephas P. Sly
BY
ATTORNEY

UNITED STATES PATENT OFFICE.

CEPHAS P. SLY, OF EAST AURORA, NEW YORK.

CHAIN SAW.

1,363,171.                     Specification of Letters Patent.     Patented Dec. 21, 1920.

Application filed January 3, 1919. Serial No. 269,463.

*To all whom it may concern:*

Be it known that I, CEPHAS P. SLY, a citizen of the United States of America, and a resident of the city of East Aurora, in the county of Erie and State of New York, have invented certain new and useful Improvements in Chain Saws, of which the following is a full, clear, and exact description.

The principal object of my invention is to provide a chain saw which shall be simple in its construction and inexpensive to manufacture.

Another object is to provide a chain saw, the links of which may be made from material of uniform thickness.

The above objects and advantages, as well as others which will be apparent to those skilled in the art, have been accomplished by the device shown in the accompanying drawings, of which:

My saw comprises a plurality of angular links 10 and 11 alternately arranged and each provided with apertures 12, one at each end. The links are connected by means of rivets 13 which pass through the apertures and are preferably countersunk flush with the faces of the links.

Figure 1:
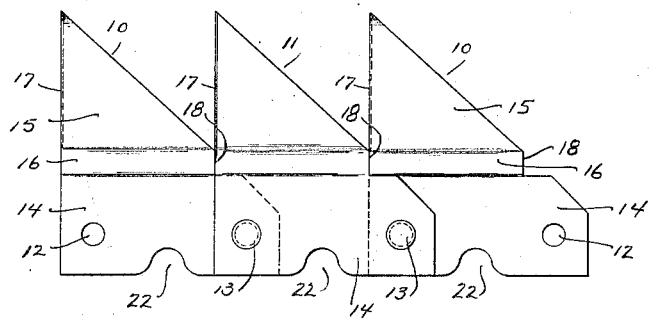
Figure 1 is a side view of a portion of a saw constructed according to my invention.
Figure 2:
Fig. 2 is a plan view of the same.
Figure 4:
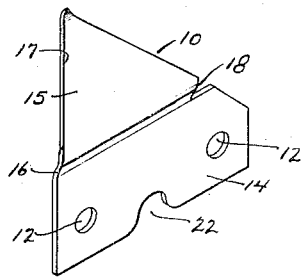
Fig. 4 is a perspective view of a single link of my saw.
Figure 3:
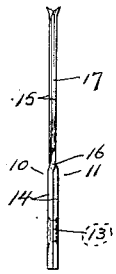
Fig. 3 is an end, front view of the same.

Each of the links 10, which is formed of material of uniform thickness, is provided with an inner body portion 14, in which the apertures 12 are formed, and with an outer tooth portion 15. The body portion 14 and tooth portion 15 of each of the links of my chain are offset by providing a bent portion 16, which connects the body and tooth portions. As viewed in Fig. 4, where one of the links 10 is shown, the tooth portion 15 lies in a plane to the right of the plane of the body portion 14. The links 11 are like the links 10, except that the tooth portion 15 of each is arranged so as to lie in a plane which is at the left of the plane of the body portion of each of these links, when the same is viewed from the front edge as shown in Fig. 4. As clearly shown in Figs. 2 and 3, this arrangement provides a combined cutting edge for the chain saw, which makes a kerf wider than the thickness of the material forming the links of the chain, whereby the tooth portions will freely pass through the material being cut. Each of the cutting edges of the tooth portions 15 is preferably chamfered, as shown in the drawings, so as to provide a cutting edge 17 forming an acute angle with the face of the tooth portion. The extreme outer point of the tooth portion of each blade is bent outwardly, as clearly shown, so as to provide the proper "set" for the saw.

At the rear of each of the links the bent portion 16 is cut away so as to provide a shoulder or abutment 18. Inasmuch as the portions 16 are alternately bent on adjacent links, it will be seen that the shoulder or abutment 18 will engage with the front edge of the bent portion at the front edge of the following link and thus provide a stop for preventing the relative rotation of the links when under the pressure of the cut. The links, however, are free to rotate in the opposite direction, as clearly shown in Fig. 5, so that the chain may be passed about suitable sprocket wheels.

Figure 5:
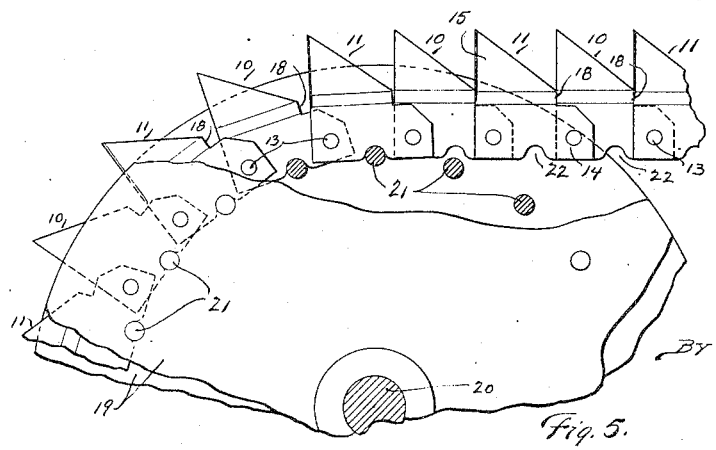
Fig. 5 is a fragmentary view of my saw, showing one method of mounting and driving the same.

In Fig. 5, I show one form of driving means for my chain saw. As there shown, two annular disks 19 are provided. These disks are suitably mounted upon the driving shaft 20 and are connected near their outer peripheries by means of a plurality of pins 21. These pins are spaced equidistantly and each is engageable with a notch 22, which is provided in the inner edge of the body portion of each of the links 10 and 11. This arrangement provides a very powerful and efficient drive for my saw.

It will be clearly seen from the foregoing, that the links of my saw may be made of material of uniform thickness; and because of the offset arrangement of the tooth portions of the blades, the links may be arranged in lapped relation to each other. These features all tend to provide an inexpensive and efficient construction.

While I have shown notches provided in the lower edges of the links, and pins provided in the driving wheel, it is obvious that the links may be provided with lugs and the driving wheel may be provided with suitable means for engaging the notches or the lugs of the links and thereby drive the chain saw. These and other modifications of the details herein shown and described may be made without departing from the spirit of my invention or the scope of the appended claims, and I do not, therefore, wish to be limited to the exact embodiment herein shown and described.

Having thus described my invention, what I claim is:

1. A chain saw comprising links parallel throughout their length on both sides to the cutting plane of the saw and having portions offset to aline with and abut against each other in a common plane to prevent the cutting edge from assuming a concave form.

2. In a chain saw, a plurality of pivotally united saw-tooth links, each link having a body portion, a tooth portion, and a bent portion, the bent portion connecting the body and tooth portions, and the tooth portion being in offset relation to the body portion.

3. In a chain saw, a plurality of links disposed in staggered, lapped arrangement, each link being formed with a body portion and a tooth portion, and means, flush with the outer faces of adjacent body portions, for pivotally uniting the same, the tooth portion of each link lying in offset relation with its body portion, whereby the saw may pass through the cut made by it.

4. In a chain saw, a plurality of pivotally united saw-tooth links, each link having a body portion, a tooth portion, and a bent portion, the bent portion being located between the cutting edge of the link and its point of pivotal connection, the tooth portion lying in offset relation with its body portion, whereby the saw may pass through the cut made by it.

5. The combination with a chain saw, comprising a plurality of pivotally united saw-tooth links in staggered, lapped arrangement, each link having a body portion, a tooth portion, and a bent portion, the bent portion connecting the body and tooth portions, the tooth portion being in offset relation to the body portion, and the body portion of each link being provided with a notch in its lower surface, of means for driving the said saw comprising a driving wheel provided with means for engaging the notches of the links and thereby driving the same.

6. In a chain saw, a plurality of saw tooth links disposed in staggered, lapped arrangement, and means for pivotally uniting the links, each link being formed with a longitudinally bent portion for coaction with the oppositely bent portion of the next adjacent link, whereby the saw is kept in a straight line when under the pressure of the cut.

7. In a chain saw, a plurality of saw tooth links, said links being of uniform thickness of material and disposed in staggered, lapped arrangement, and means for pivotally uniting the links, each link being formed with a longitudinally bent portion for coaction with the oppositely bent portion of the next adjacent link, whereby the saw is kept in a straight line when under the pressure of the cut.

8. An angular link for chain saws constructed with an inner body portion having rivet-apertures, one at each end, and a drive pin notch at its inner edge, an outer tooth portion and an offset between the said inner body portion and the said outer body portion so as to provide a bent portion connecting the body portion and the tooth portion, the offset being cut away at its rear end so as to provide a shoulder or abutment and form a stop.

9. An angular link for chain saws constructed with an inner body portion having rivet-apertures, one at each end, and a drive-pin notch at its inner edge, an outer tooth portion chamfered at its forward end so as to provide a cutting edge, a bent point on the said cutting edge and an offset between the said inner body portion and the said outer body portion so as to provide a bent portion connecting the body portion and the tooth portion, the offset being cut away at its rear end so as to provide a shoulder or abutment and form a stop.

In testimony whereof, I have hereunto signed my name.

CEPHAS P. SLY.